United States Patent [19]
Fuehrer et al.

[11] Patent Number: 5,362,276
[45] Date of Patent: Nov. 8, 1994

[54] SELECTIVE TORQUE CLIPPING MECHANISM

[75] Inventors: Reece R. Fuehrer, Danville; Roy K. Martin, Plainfield, both of Ind.

[73] Assignee: General Motors Corporation, Detroit, Mich.

[21] Appl. No.: 939,751

[22] Filed: Sep. 2, 1992

[51] Int. Cl.⁵ .............................................. F16D 1/12
[52] U.S. Cl. ................................ 464/160; 192/106.1; 464/68
[58] Field of Search .................... 464/160, 30, 66, 68, 464/24, 2; 192/70.16, 70.17, 85 R, 103 F, 103 A, 106.1

[56] References Cited

U.S. PATENT DOCUMENTS

| | | | |
|---|---|---|---|
| 4,509,627 | 4/1985 | Kawamoto | 192/103 F X |
| 4,828,533 | 5/1989 | Focqueur et al. | 464/68 X |
| 4,906,220 | 3/1990 | Wörner et al. | 464/68 |
| 4,936,434 | 6/1990 | Clancey | 464/28 X |
| 5,048,658 | 9/1991 | Reik | 192/103 F X |

FOREIGN PATENT DOCUMENTS

| | | | |
|---|---|---|---|
| 4134406 | 4/1992 | Germany | 464/24 |
| 2197428 | 5/1988 | United Kingdom | 464/68 |
| 2219647 | 12/1989 | United Kingdom | 464/68 |

*Primary Examiner*—Daniel P. Stodola
*Assistant Examiner*—Eileen A. Dunn
*Attorney, Agent, or Firm*—Donald F. Scherer

[57] ABSTRACT

A torque clipping mechanism embodying the concepts of the present invention is adapted to obviate torque spikes from being imparted to the transmission of a vehicle by the crankshaft of an engine during the start-up and shut-down procedures for that engine. The torque clipping mechanism operates in conjunction with a torque transfer device that is operatively connected between the crankshaft, which delivers torque from the engine, and the rotatable input shaft of a vehicular transmission. A spring is employed to effect the application of the torque transfer device, but the spring allows slippage of the torque transfer device upon the application of a pre-determined torsional force to the torque transfer device. Hydraulic fluid acting under centrifugal force is employed to preclude slippage when the rotational speed of the power output shaft exceeds a predetermined rate.

9 Claims, 2 Drawing Sheets

SELECTIVE TORQUE CLIPPING MECHANISM

TECHNICAL FIELD

The present invention relates generally to a torque clipping mechanism. More particularly, the present invention relates to a torque clipping mechanism that will operate in conjunction with a clutch-like torque transfer device selectively to allow slippage of that torque transfer device upon the application of a predetermined torsional loading. Specifically, the present invention relates to a torque clipping mechanism that is adapted to preclude the transfer of torsional forces above a predetermined value during engine start-up and shut-down, but which will permit the transfer of torsional forces that are equal to or greater than those same torsional forces after the engine has reached at least idling speed.

BACKGROUND OF THE INVENTION

It is well known that torque spikes can be produced by an engine during the start-up and at shut-down procedures. Typically, such torque spikes are the result of the fact that engines, and the mechanism of the output drive connection, often have a resonant frequency which occurs at some engine speed that is less than idle speed. Hence, as the rotational speed of the engine passes through that speed which produces torque resonance during its start-up and/or shut-down procedures, the torque supplied by the power output shaft of the engine to the downstream components of the transmission may be greater than would otherwise be expected. This increased torque output spikes during the power stroke of the engine.

In general terms the power available at the output shaft of an engine may be considered as tire product of tire output shaft speed multiplied by the torque delivered by the output shaft. Engine operating speeds per se, and even wide variations of that speed, do not impart deleterious forces to the downstream components of the transmission. Torque spikes, on the other hand, can impart deleterious forces to the components of the transmission at virtually any rotational speed.

A recent trend among the manufacturers of engines has increased the incidence of deleterious torque spikes. Specifically, some manufacturers have elected to reduce the number of pistons in order to reduce the cost of building engines adapted to supply a given horsepower. When two engines deliver the same rated horsepower at a given rotational speed, the engine having the lesser number of cylinders, and therefore a lesser number of power strokes per revolution, will deliver a greater torque during each power stroke. As such, the torque applied by such an engine, when rotating at the resonant frequency, can have a significantly deleterious effect on the downstream components of the transmission. And yet, when an engine is operating at speeds above those which impart the resonant frequency, it is counterproductive to reduce the torque available to the transmission from each power stroke of the engine.

SUMMARY OF THE INVENTION

It is, therefore, a primary object of the present invention to provide a torque clipping mechanism that will permit a torque transfer device to slip in response to the application of a pre-determined torsional force.

It is another object of the present invention to provide a torque clipping mechanism, as above, that will also preclude the aforesaid slippage when the torque transfer device is rotating above a predetermined rotational value.

It is a further object of the present invention to provide a torque clipping mechanism, as above, that employs a spring means by which operatively to engage, or apply, the torque transfer device, the biasing action of the spring means permitting slippage of the torque transfer device when the torsional force applied to the torque transfer device exceeds a pre-determined value.

It is still another object of the present invention to provide a torque clipping mechanism, as above, wherein the centrifugal force of the hydraulic fluid within the casing that houses the torque transfer device will act to maintain engagement of the torque transfer device when the rotational speed exceeds a predetermined value.

These and other objects of the invention, as well as the advantages thereof over existing and prior art forms, which will be apparent in view of the following detail specification, are accomplished by means hereinafter described and claimed.

In general, a torque clipping mechanism embodying the concepts of the present invention is adapted to obviate torque spikes from being imparted to the transmission of a vehicle during engine start-up and shut-down procedures. The mechanism operates in conjunction with a torque transfer device that is operatively connected between a rotatable power output shaft—such as a crankshaft—that delivers torque from an engine and a rotatable input shaft of a vehicular transmission. Spring means effect the application of the torque transfer device, but the spring means allows slippage or the torque transfer device upon the application or a pre-determined torque value to the torque transfer device. Means are also provided to preclude such slippage when the rotational speed of the power output shaft exceeds a predetermined rate.

The present invention is described in conjunction with one exemplary embodiment of a torque dipping mechanism embodying the concepts of the present invention, and that embodiment is deemed sufficient to effect a full disclosure of the subject invention. The exemplary torque clipping mechanism is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
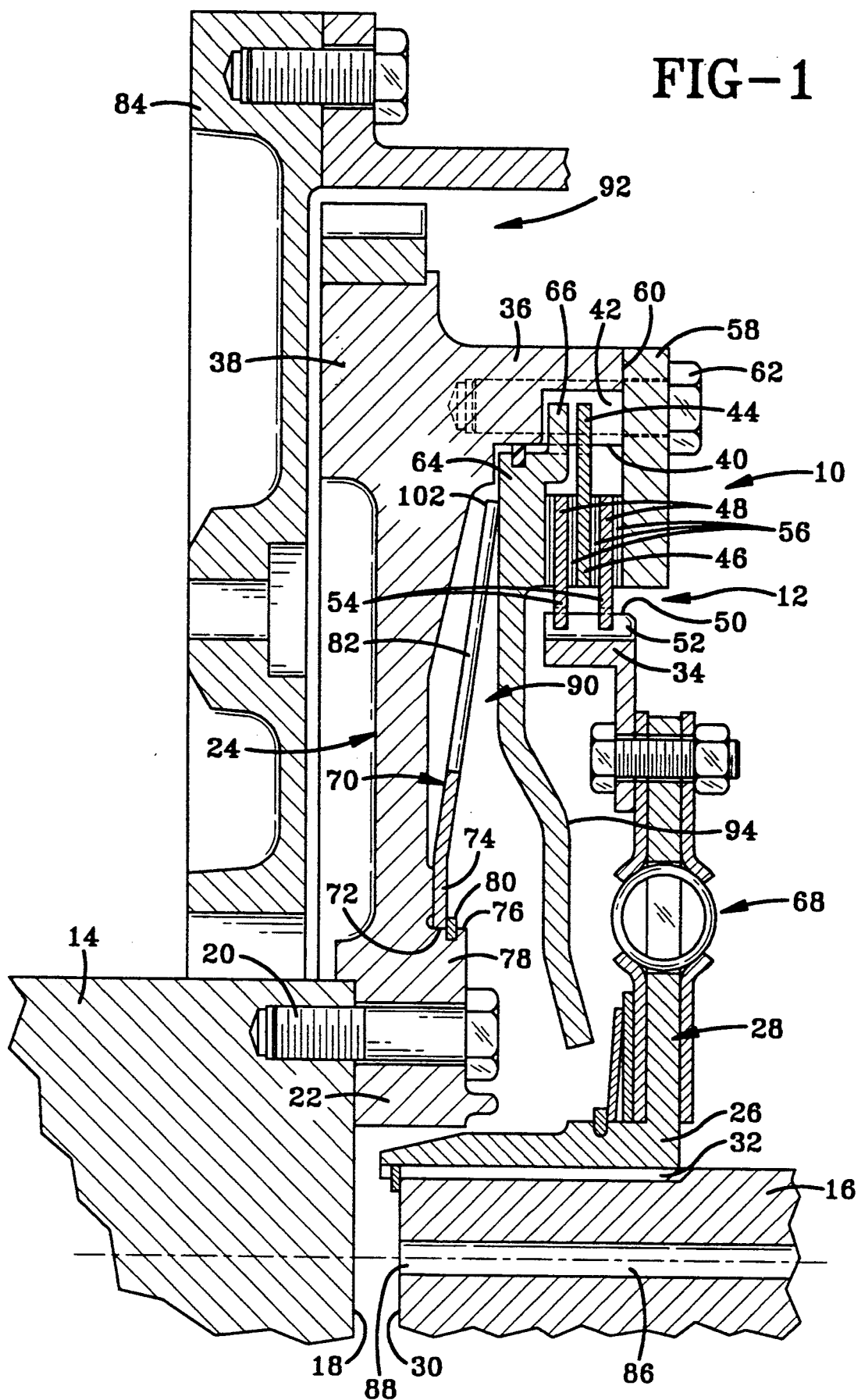
FIG. 1 is a cross sectional representation of a torque clipping mechanism embodying the concepts of the present invention and employed in conjunction with a torque transfer device that is operatively connected between the crankshaft of an engine and the input shaft of a transmission; and, FIG. 2 is a graph which not only depicts the parameters in response to which the engine output torque is clipped during the start-up and shut-down procedures but also depicts the parameters in response to which the transfer of comparable, or greater, torsional forces between the crankshaft of the engine and the input shaft of a transmission is effected when the engine is operating at above idle speeds.

One representative form of a selective torque clipping mechanism embodying the concepts of the present invention is designated generally by the numeral 10 on the accompanying drawings. The representative torque clipping mechanism 10 is operatively associated with a torque transfer device 12 that is interposed within the drive train that transfers power between a rotatable crankshaft 14, as from an engine (not shown), to an input shaft 16, as in a transmission (also not shown).

With particular reference to FIG. 1, the outboard end 18 of the engine crankshaft 14 is secured, as by machine screws 20, to the hub portion 22 of a flywheel 24. The hub portion 26 of a radially disposed connecting plate 28 is connected to the outboard end 30 of the input shaft 16, as by a splined connection 32. The radially outermost rim portion 34 of the connecting plate 28 is disposed in radial opposition to a mounting annulus 36 that extends axially outwardly from one side of the flywheel rim portion 38.

The torque transfer device 12 is operatively connected between the mounting annulus 36 on the flywheel 24 and the rim portion 34 of the connecting plate 28. Specifically, the radially inner surface 40 of the mounting annulus 36 may be axially slotted, as at 42, to receive the tangs 44 of a first, annular torque plate 46 and thereby assure that the first torque plate 46 is not relatively rotatable with respect to the mounting annulus 36, and thus the flywheel 24, irrespective of whether the flywheel 24 is itself rotating or fixed. To assure that the interaction between the mounting annulus 36 and the tangs 44 is sufficient to withstand the loading to which the tangs 44 may be subjected, a plurality of axial slots 42 are employed at circumferentially spaced intervals about the radially inner surface 40 of the mounting annulus 36, and the first torque plate 46 is provided with a sufficient number of tangs 44 to interact with those slots 42, as is well known to the art. For simplicity only one torque plate 46 is depicted, but it should be appreciated that a plurality of such plates 46 may be stacked in operative relation with the hereinafter described second torque plates 48, as is also well known to the art.

The radially outer surface 50 on the rim portion 34 of the connecting plate 28 is also axially slotted, as at 52, at circumferentially spaced intervals about the outer surface 50 to receive the several tangs 54 which extend radially inwardly from each of the plurality of second, annular torque plates 48 and thereby assure that the second torque plates 48 will not rotate relative to the connecting plate 28, and thus the transmission input shaft 16, as is also well known to the art.

An annular friction disk 56 is interposed between each successive first and second torque plates 46 and 48, respectively. To assure that the several friction disks 56 will not be displaced when they are not compressed between the successive first and second torque plates 46 and 48, each friction disk 56 may preferably be secured to one of the torque plates 46 or 48 between which it is sandwiched. For example, as is well known to the art, the friction disks 56 may be bonded to either the first or second torque plates 46 or 48 by a suitable adhesive.

An annular backing, or mounting, plate 58 is also preferably supported by the mounting annulus 36. Backing plates typically employed with torque transfer devices may also be secured in position by the interaction of a plurality of tangs (not shown) with axial slots such as those identified by the numeral 42, but they may also, as depicted, be secured to the axially outer face 60 of the mounting annulus 36, as by a plurality of circumferentially spaced machine screws 62. Irrespective of how the backing plate interacts with the member from which it is supported, the purpose of the backing plate 58 is to determine the limit to which the first and second torque plates 46 and 48, respectively, may be displaced, as will be hereinafter more fully discussed.

An annular pressure plate 64 may be similarly provided with a plurality of tangs 66 which extend radially outwardly therefrom to be received within the axial slots 42 in the inner surface 40 of the mounting annulus 36 on the flywheel 24. The pressure plate 64 is thus disposed in opposition to the backing plate 58, with the first and second torque plates 46 and 48 being sequentially sandwiched therebetween, as depicted in FIG. 1.

For a reason that will also be hereinafter more fully described, a transient torque damper 68 is preferably incorporated in the connecting plate 28. An excellent example of a transient torque damper of the type recommended for the present arrangement is disclosed in detail in U.S. Pat. No. 5,009,301 which issued on Apr. 23, 1991, to General Motors Corporation.

A diaphragm, or Bellville, spring 70 may be supported from the hub portion 22 of the flywheel 24. As shown, a central aperture 72 extends through the hub portion 74 of the diaphragm spring 70, and the central aperture 72 is received over the annular outer surface 76 on the axial extension 78 of the hub portion 22. The hub portion 74 of the diaphragm spring 70 may be secured onto the hub 22 of the flywheel 24 by a retainer ring 80. A plurality of arms 82 extend outwardly from the hub portion 74 of the diaphragm spring 70 to engage the pressure plate 64 and compresses the torque plates 46 and 48 between the pressure plate 64 and the backing plate 58 by virtue of a predetermined compressive force.

It should be noted that the flywheel 24, the connecting plate 28, the torque transfer device 12 and the torque clipping mechanism 10 are contained within a housing 84. The housing 84 may also constitute the casing in which the transmission (not shown) is received. In any event, the housing 84 contains lubricating fluid which may flow through a feed passage 86 that extends axially within the transmission input shaft 16 to exit through the discharge port 88 in the outboard end portion 30 of the transmission input shaft 16. The hydraulic fluid then flows, by centrifugal action, into a chamber-like portion 90 of the cavity 92 within the housing 84 which extends between the flywheel 24 and the directing disk portion 94 of the pressure plate 64.

It is preferred that the directing disk portion 94 is cortically tapered in opposition to the flywheel 24 such that the centrifugal force applied to the hydraulic fluid is channelled to flow into the chamber-like portion 90 of the cavity 92. Because the diaphragm spring 70 has a plurality of arms 82, the centrifugally pressurized hydraulic fluid will flow on both sides of the diaphragm spring 70 such that the chamber-like portion 90 of the cavity will be pressurized above the magnitude of the remainder of the cavity 92.

Any of the centrifugally pressurized hydraulic fluid which is thrown into that portion of the cavity 92 between the directing disk portion 94 of the pressure plate 64 and the connecting plate 28 will simply escape along the slot 52 or through the interstices within the structure of the damper 68. As a result, the centrifugally pressurized hydraulic fluid within the chamber-like portion 90 of the cavity 92 will assist the diaphragm spring 70 in compressing the torque disks 46 and 48—and the interposed friction disks 56—between the pressure plate 64 and the backing plate 58.

In the present environment a diaphragm spring 70 will provide a constant force, irrespective of the engine speed. Thus, without any additional force applied to the torque transfer device 12 other than that applied by the diaphragm spring 70, the torque transfer device will slip in response to a torsional force that is greater than the torsional force which would be resisted by the application of the constant force applied by the diaphragm spring 70. The specific diaphragm spring 70 is, therefore, selected to apply a compressive force to the torque plates 46 and 48 sandwiched between the backing plate 58 and the pressure plate 64 which will effect a torque transfer between the flywheel 24 and the connecting plate 28 of only those torque values that are lesser than a predetermined value. In response to a greater torque value the torque transfer device 12 will slip. The parameters by which the components are selected to achieve the foregoing result are represented graphically in FIG. 2. Specifically, the predetermined torsional value at which the torque transfer device 12 is designed to slip when under the sole influence of the diaphragm spring 70 is represented by the abscissa 98 on FIG. 2.

Figure 2:
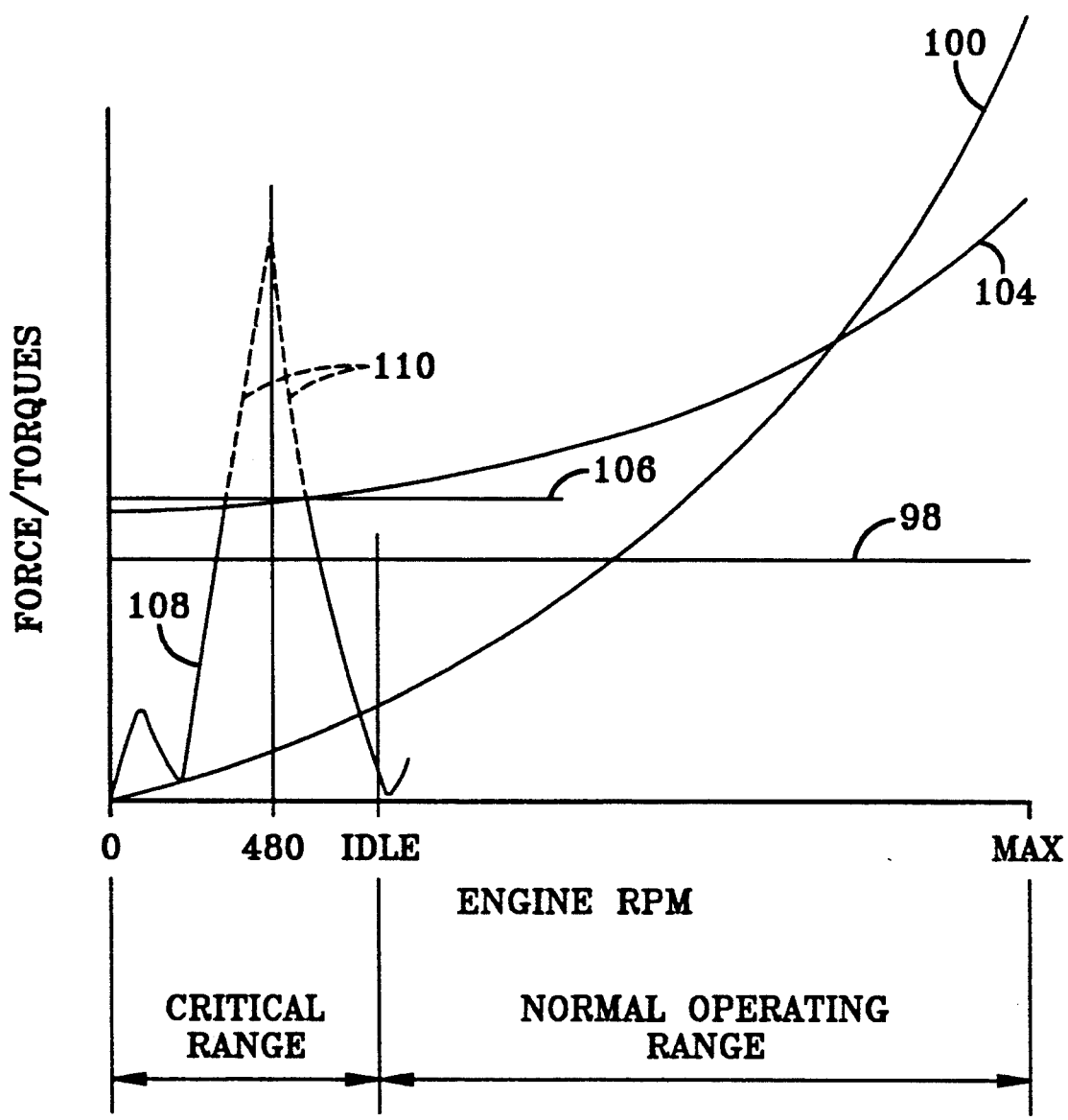

In addition to the constant compressive force applied by the diaphragm spring 70, the torque transfer device 12 is also subjected to a compressive force applied by the centrifugally pressurized hydraulic fluid. Curve 100 in FIG. 2 represents the progressive increase in the pressure of the hydraulic fluid achieved at the apex 102 of the radial arms 82 of the diaphragm spring 70 in response to rotation of the crankshaft 14 and the components operatively connected thereto within cavity 92.

The force represented by the curve 100 is, of course, the maximum force applied by the hydraulic fluid at the radially outermost extremity, or apex, 102 on the arms 82 of the diaphragm spring 70. That force is progressively smaller as one moves radially inwardly along the force apply surfaces—the surfaces on the annular pressure plate 64, and the directing disk portion 94 thereof, as well as the diaphragm spring 70 against which the pressurized hydraulic fluid is acting. The product of that average force multiplied by the total area of the force apply surfaces on those components, and that product added to the constant force applied by the diaphragm spring on its own, constitutes the progressive force applied to the torque transfer device 12. The torsional force that can be resisted by that combined force applied to the torque transfer device 12 is represented by the clutch capacity curve 104 on FIG. 2.

In designing the torque clipping mechanism 10 one determines at approximately what torque loading the torque transfer device 12 should be designed to slip in order to effect the desired clipping action. In the situation under discussion the clipping action occurs in response to the torque spikes encountered during the engine start-up and shut-down procedures. As explained, the torsional force that is desired to be resisted by the compressive force of the diaphragm spring 70 is represented by abscissa 98 on FIG. 2. The diaphragm spring 70 is then selected in conjunction with the value to which the hydraulic fluid will be centrifugally pressurized—as represented by curve 100—to prevent the resulting deleterious forces from being applied to the components of the transmission. The maximum torque which can be applied to the transmission under shock loading without deleterious results to the downstream components of the transmission is represented by abscissa 106. Hence, a diaphragm spring 70 is selected which will cause the curve 104 to intersect the torque spike curve 108 at no greater value than delineated by abscissa 106.

Thus, as the torque spike curve 108—which results from the resonant 480 revolutions per minute—exceeds the maximum torque shock loading that should reasonably be transferred by the torque transfer device 12, as represented by curve 106, the torque transfer device 12 will slip.

In actuality, the clutch capacity curve 104 delineates the slip point. Thus, the dashed line portion 110 of the torque spike curve 108 represents the torsional force that is "clipped" as the torque transfer device 12 slips under the application of a predetermined torque.

However, when the engine begins to exceed its idling speed it is generally desirable to preclude further clipping of the torsional forces even though they may have a value which exceeds the values beyond which the torque transfer device 12 was designed to slip during the start-up and shut-down procedures. In order to effect only selective clipping, the energy imparted to the hydraulic fluid within the housing 84 by centrifugal force is employed to preclude further clipping. Specifically, the centrifugal force of the hydraulic fluid within the chamber-like portion 90 of the cavity 92 forces the pressure plate 64 and the diaphragm spring 70 to impart a greater compressive force to the torque plates 46 and 48. This greater compressive force precludes the torque transfer device 12 from slipping. The greater the rotational speed of the conjoined crankshaft 14 and the transmission input shaft 16, the greater the centrifugal force applied to the hydraulic fluid within the cavity 90 and thus the increasingly higher the torque that can be transferred without incurring slippage of the torque transfer device 12. As will be observed from FIG. 2, the clutch capacity curve 104 exceeds the maximum shock loading torque value represented by abscissa 106 after the engine safely exceeds the resonant speed.

Hence, the present invention not only teaches that a torque clipping mechanism embodying the concepts of the present invention can be associated with a torque transfer device to provide selective torque clipping but also that the other objects of the invention can likewise be accomplished.

We claim:

1. A selective torsion clipping mechanism adapted to be interposed between a rotatable power output shaft and a rotatable transmission input shaft, said torsion clipping device comprising:

a torque transfer device having a plurality of interleaved torque plates interposed between the rotatable power output shaft and the rotatable transmission input shaft;

a spring biasingly interposed between said rotatable power output shaft and said torque transfer device to apply an axially compressive force to said interleaved torque plates in order to effect rotation of the transmission input shaft in response to rotation of the power output shaft;

said spring permitting slippage of said interleaved torque plates upon the application of a predetermined torsional force between said power output shaft and said transmission input shaft;

means in conjunction with said spring to preclude said slippage of said torque transfer device in response to rotation of the power output shaft above a predetermined rate of rotation.

2. A mechanism, as set forth in claim 1, wherein said means to preclude slippage comprises:
hydraulic means that augments the application of said torque transfer device by applying centrifugally augmented hydraulic pressure to said torque transfer device.

3. A mechanism, as set forth in claim 1, further comprising:
a pressure plate to compress said interleaved torque plates to effect the application thereof;
a housing having a cavity within which to encase said mechanism;
a chamber-like portion of said cavity exposed to said pressure plate and said spring;
centrifugally pressurized hydraulic fluid within said cavity;
said centrifugally pressurized hydraulic fluid within said chamber-like portion of said cavity increasing the application of said interleaved torque plates.

4. A mechanism adapted to obviate torque spikes from being imparted to the transmission of a vehicle during engine start-up and shut-down, said mechanism comprising:
a crankshaft to deliver torque from an engine;
a rotatable input shaft of a vehicular transmission;
a torque transfer device having a plurality of interleaved torque plates interposed between said crankshaft and said rotatable transmission input shaft;
a spring biasingly interposed between said crankshaft and said torque transfer device to apply an axially compressible force to said torque transfer device and to allow slippage of said torque transfer device upon the application of a pre-determined torque value thereto; and
means no preclude slippage of said torque transfer device when said crankshaft exceeds a predetermined rotational rate.

5. A mechanism, as set forth in claim 4, further comprising:
a pressure plate acting between said torque transfer device and said spring means.

6. A mechanism, as set forth in claim 5, wherein said spring comprises:
a diaphragm spring supported from said crankshaft and operatively engaging said pressure plate.

7. A mechanism, as set forth in claim 6, wherein said means to preclude slippage comprises:
hydraulic fluid that augments the application of pressure to said torque transfer device by applying hydraulic pressure to said diaphragm spring and said pressure plate in response to a centrifugal force imparted to the hydraulic fluid by the rotation of at least said crankshaft.

8. A mechanism, as set forth in claim 7, further comprising:
a flywheel secured to said crankshaft;
said torque transfer device and said pressure plate being supported from said flywheel.

9. A selective torsion clipping mechanism adapted to be interposed between a rotatable power output shaft and a rotatable transmission input shaft, said torsion clipping device comprising;
a torque transfer device having a plurality of interleaved torque plates interposed between the rotatable power output shaft and the rotatable transmission input shaft;
a pressure plate operatively communicating with and operatively compressing said torque transfer device to effect the application thereof;
a spring biasingly interposed between said rotatable power output shaft and said torque transfer device to apply an axially compressive force directly to said pressure plate and operatively to said torque transfer device in order to effect rotation of the transmission input shaft in response to rotation of the power output shaft;
said spring permitting slippage of said torque transfer device upon the application of a predetermined torsional force between said power output shaft and said transmission input shaft;
means in conjunction with said spring to preclude said slippage of said torque transfer device in response to rotation of the power output shaft above a predetermined rate of rotation.

* * * * *